United States Patent [19]

Anderson

[11] 4,392,690

[45] Jul. 12, 1983

[54] QUICK RELEASE WHEEL MOUNT

[76] Inventor: Raymond A. Anderson, 360 Capital Ave., Battle Creek, Mich. 49017

[21] Appl. No.: 242,015

[22] Filed: Mar. 9, 1981

[51] Int. Cl.³ .......................................... B60B 37/00
[52] U.S. Cl. .................................... 301/121; 280/647; 280/242 WC; 297/DIG. 4
[58] Field of Search ......................... 16/38; 152/375; 280/242 WC, DIG. 6, 647; 297/DIG. 4; 301/11, 87, 105 B, 105 R, 110, 111, 112, 113, 115, 119, 120, 122, 121; 403/DIG. 4

[56] References Cited

U.S. PATENT DOCUMENTS 982,413  1/1911  Davis ................................. 301/119
3,893,708  7/1975  Maroney ..................... 280/242 WC

FOREIGN PATENT DOCUMENTS 404423  1/1934  United Kingdom ................ 301/111

Primary Examiner—John A. Pekar
Assistant Examiner—Pierre L. Huggins
Attorney, Agent, or Firm—Austin A. Webb

[57] ABSTRACT

An axle pin sized to fit in slidable supporting engagement within the wheel bearing of existing occupant actuated wheel chairs has a nut-like head and shoulder on one end that abuts the inner race of the bearing. An annular grove in the axle pin receives a snap ring abutting the opposite end of the bearing. The portion of the pin beyond the groove is sized to fit in close slidable relation within the axle receiving bore formed in an existing chair. The pin has a shoulder connected to an integral axially projecting end extending beyond the frame. A body member defines a bore receiving the projecting end of the pin. The body member has an integral externally threaded neck fitting around the pin and threads into the existing frame and abuts the shoulder on the pin. The body member defines an internally threaded transverse bore which intersects the pin receiving bore. A lock support member with a spring pressed lock pin therein is engagable in the bore in the body with the end of the lock pin projectable into an annular groove formed in the axle pin. A pull ring on the lock pin permits retraction of the lock pin to permit removal of the axle pin and the wheel as a unit.

6 Claims, 2 Drawing Figures

QUICK RELEASE WHEEL MOUNT

OUTLINE OF INVENTION

Collapsible wheel chairs for handicapped persons and having large main wheels which may be actuated by the person seated in the chair, on the ends of transverse axles are well known. Usually the wheels remain on the axles and the chair when the chair is folded or collapsed. Removal of the wheels is not intended and is difficult. The present invention provides a quick disconnect connection between the stub axles and the frame of a standard collapsible wheel chair, which further connects each wheel to a stub axle, to permit the axles and wheels to be easily removed from the frame as units.

DETAILED DESCRIPTION

Figure 1:
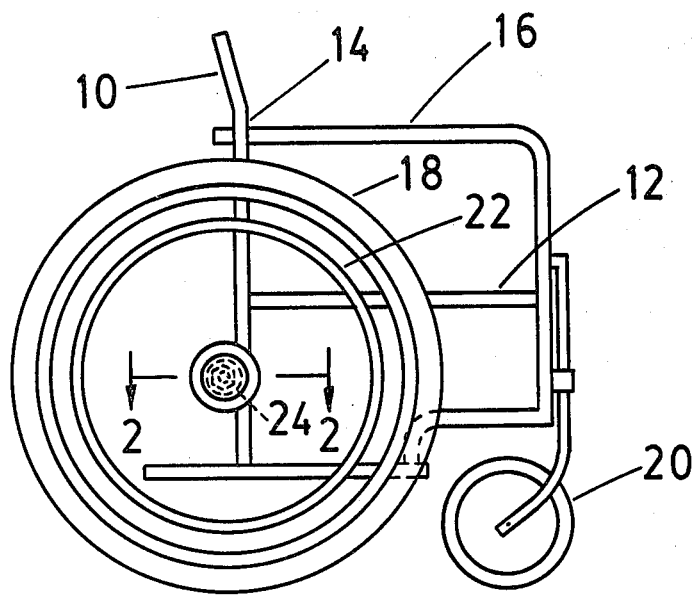

The drawings of which there is one sheet, show a preferred form of the wheel mount of the invention FIG. 1 is a side elevational view of a conventional wheel chair to which the wheel mount of the invention may be applied.

Figure 2:
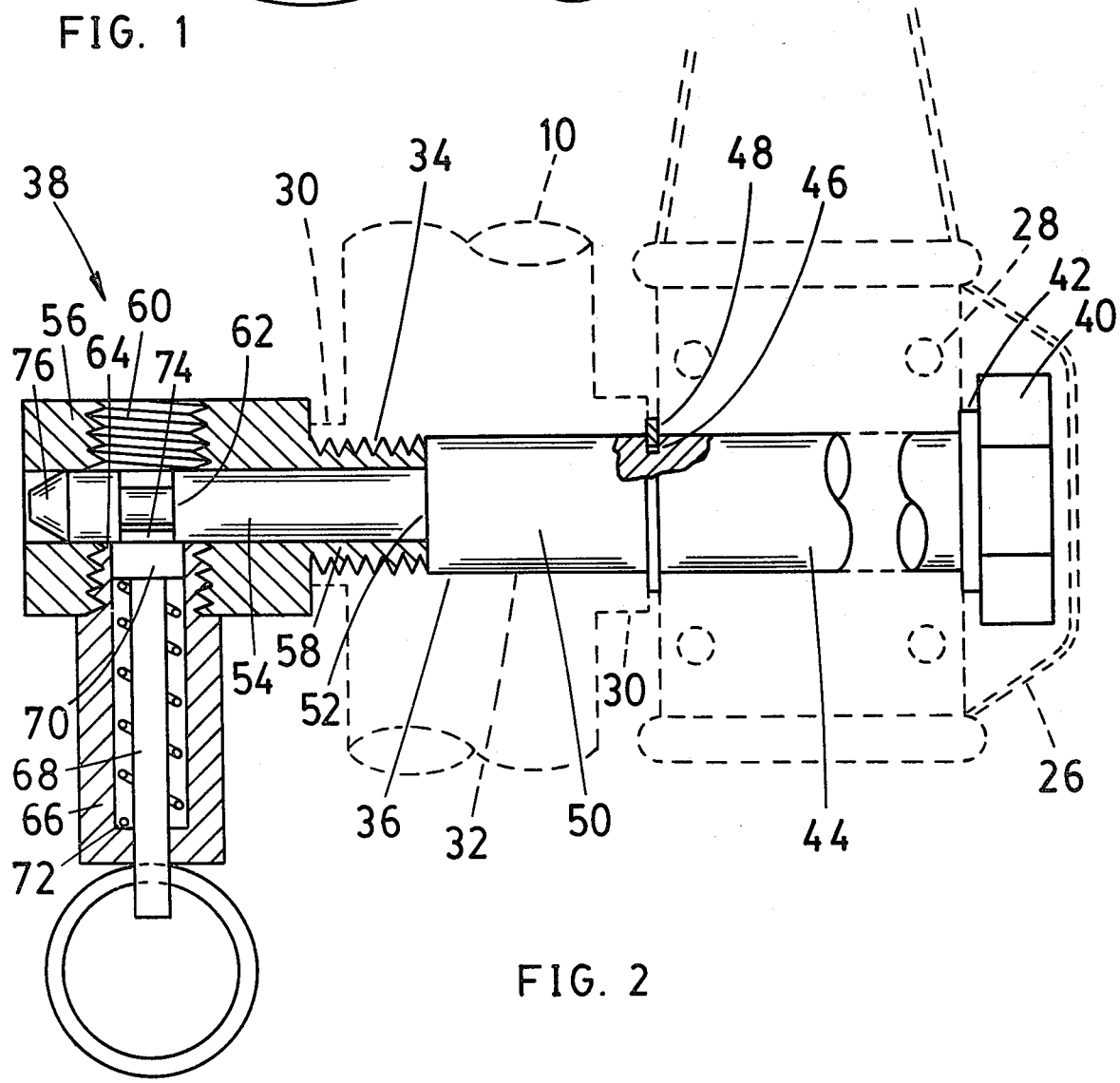

FIG. 2 is an enlarged fragmentary cross sectional view taken along the plane of the line 2—2 in FIG. 1 and looking in the direction of the arrows, and showing the wheel mount assembled on the frame of an existing wheel chair. The frame and the wheel, which may also be the existing wheel, are shown in dotted lines. FIG. 1 illustrates a conventional wheelchair having frame members 10 which support a seat 12 and back-rest 14, with arm rests 16 on main wheels 18 and castor wheels 20. The main wheels have side rings 22 which the occupant may grasp to move the chair. Such chairs have been standardized to use the same main wheels by means of stub axles having nut-like heads 24 at their outer ends. Hub caps or discs 26 may removably cover the bearings 28 and the ends of the axles. The frame members 10 may vary in size but have boss-like projections 30 which are spaced apart by a standardized width and define a transverse axle receiving bore 32. Nuts (not illustrated) engage threads on the inner ends of the standard axle pins and lock the pins in threads 34 formed internally at the inner ends of the axle bore 32. Two wrenches are thus required to remove the wheels, plus a pry tool to remove the hub caps.

With the advent of the current smaller size automobiles, it has been found difficult and inconvenient, if not impossible, to carry standard folding wheelchairs in the space available without removing the large standard wheels 18. The hub caps 26 must be removed and the inner nuts must be held while the heads 24 are turned to remove the axle pins and the wheels. After the wheels and frame (folded) are stored, the user then has six small parts, plus the tools which may be lost or misplaced in transit. Even if no parts are misplaced, re-assembly of the wheels on the frame is time consuming and awkward.

The present invention alieviates the problem by providing substitute stub-axles 36 which are more or less permanently connected to their associated standard wheels 18, and which are easily removed from the frame members 10, along with the wheels, by means of the quick release connection shown generally at 38.

The stub axle element 38 has a headed end 40 which is covered by the cap plate 26, and a shoulder 42 at its outer end. The shoulder abuts the inner race of the bearing 28 and the wheel support section 44 is sized the same as the original axle pin to fit within the wheel bearing. The new axle element has an annular groove 46 formed therein to receive a snap ring 48 at the inner end of the bearing of the wheel bearing. The function of the snap ring is to retain the axle element as part of the wheel, to prevent loss when the wheels are demounted, and retain the axle when remounted.

Inwardly from the snap ring, the axle element has a frame engaging portion 50 which fits in close supported engagement within the bore 32 in the frame. This portion terminates in a shoulder 52 extending to the integral inner end portion 54 of the axle. The reduced portion 54 is a substantially smaller diameter than the internal threads 34 in the frame member, and fits snugly and slidably into a bore formed transversely through a body member 56, which is a major part of the quick release connection 38. An integral and externally threaded tubular neck 58 on one side of the body member is sized and threaded to fit into the existing thread 34 in the frame member 10. The end of the neck abuts the shoulder 52 when the end of the body member abuts the boss 30 on the frame member.

The body member 56 also defines a bore through both of its opposite ends and in intersecting relation to the axis of the reduced inner end 54 of the axle pin. This bore is internally threaded at 60. Near its inner end, the reduced portion 54 of the axle pin defines an annular groove 62 which is located centrally of the axis of the threaded bore 60 when shoulder 52 abuts the end of the neck 58. This permits the externally threaded end 64 of a tubular lock pin support member 66 to be threaded into either end of the body member 56. By carefull machining of the neck 58 and its threads to the same length as the threads 34 in the standard frame member 10, the side of the body member may be made to abut the boss 30 and act as a lock on the threads 34 when the threaded bores 60 open generally forwardly and rearwardly of the wheelchair frame. This permits identical body members 56 to be installed in the opposite frame members of a wheelchair, and still let identical lock pin supports 66 to be attached from the same end of the chair, such as the back as shown.

The lock support member 66 encloses a lock pin 68 with its neck projecting axially from its outer end and with a shoulder 70 guiding its inner end. Spring 72 biases the pin inwardly so that its tip 74 engages in the groove 62 when either wheel 18 and its connected axle pin 44 is assembled on the outer side of either frame member.

Desireably, the extreme inner ends of the axle elements are tapered as at 76 to cam back the tips 74 of the lock pins 68. Also desirably, the external ends of the lock pins are provided with finger pieces in the form of pull rings 78 to permit easy retraction of the lock pins and demounting of the wheels with their stub axle elements. The rings may also act as limit stops as shown to assure that the shoulders of the lock pins do not project into part of the axles on assembly.

What is claimed to be new and what is desired to be secured by Letters Patent is defined in the following appended claims:

1. A quick release attachment for the wheels of collapsible chairs comprising:
   a body member attachable to the frame of a chair in place of a wheel axle,
   an axle element having one end removably extendable through the existing axle hole of the frame and into said body member and having an annular groove adjacent said one end arranged to be located within said body member when the latter is attached to said frame, a lock support member having an externally threaded end engagable in a tapped hole provided therefor in said body member in transversely intersecting relation to the groove in said axle element, a lock pin slidably positioned in said support member and extending through the opposite end of said support member, a spring in said support member biasing one end of said pin into said groove in said axle element, a finger grip element connected to said lock pin externally of said support member, said axle element having a head on the opposite end thereof from said body member engagable with one one end of a wheel of the wheelchair, said axle element further defining an external groove spaced from said head and adapted to receive a snap ring to retainingly engage the opposite end of a hub positioned against said head.

2. A quick release attachment as defined in claim 1 in which said body member is attachable to said frame by an integral neck projecting from one end of the body and externally threaded to fit into the existing threaded axle hole in the frame, said boss and said body member defining a continuous bore slidably receiving said one end of said axle element.

3. A quick release attachment as defined in claim 2 in which the end of said body member projects transversely from said neck to engage said frame when said neck is threaded into the frame.

4. A quick release attachment as defined in claim 3 in which said one end of said axle element has an inner end portion of reduced diameter which projects into said body member and its neck with the shoulder at the start of the reduced portion bearing against the end of the neck when said annular groove in the axle element is in registry with the end of the lock pin in said body and support members.

5. A quick release attachment as defined in claim 4 in which the terminal free end of the reduced diameter portion of said axle element is shaped with an axially reducing taper to cammingly retract said lock pin when said axle element is introduced into said body member, said finger piece on said lock pin coacting with the end of said lock support member as a stop to limit inward projection of said pin into said bore in said body member beyond the narrowest portion of the taper on the end of said axle element.

6. A quick release attachment as defined in claim 2 in which said tapped hole in said body member extends therethrough on both sides of said bore receiving the end of said axle element, said body member being symetrical at opposite ends of said tapped hole and having both ends tapped, whereby said support member may be assembled into either side of said body member after the body member is attached to a chair frame.

* * * * *